(No Model.)

C. F. BRUSH.
SECONDARY BATTERY.

No. 261,995. Patented Aug. 1, 1882.

=Case. H.=

WITNESSES
Ph. Engel
Jno. Crowell Jr

Charles F. Brush INVENTOR
By Leggett & Leggett
ATTORNEYS (No Model.) 2 Sheets—Sheet 2.
C. F. BRUSH.
SECONDARY BATTERY.
No. 261,995. Patented Aug. 1, 1882.
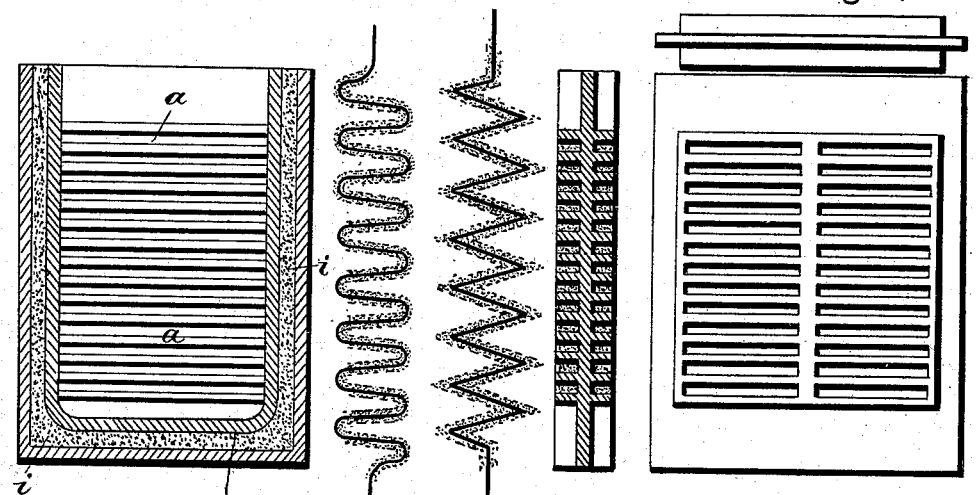
Fig. 3.    Fig. 4. Fig. 5. Fig. 6.    Fig. 7.
Fig. 8.
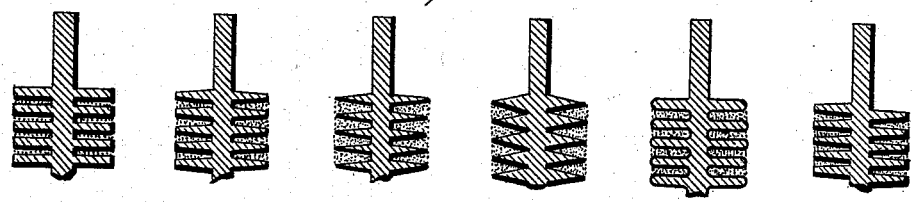
Fig. 9.      Fig. 10.      Fig. 11.
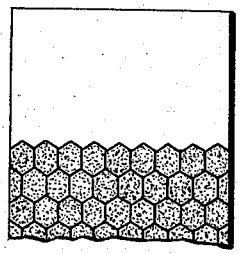 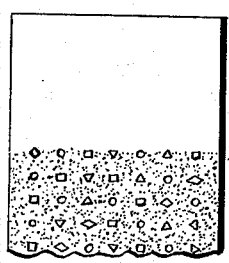 
WITNESSES                                                              INVENTOR
E. J. Nottingham                                Chas. F. Brush.
George Cook                                      By Leggett & Leggett
                                                                                   Attorneys.

UNITED STATES PATENT OFFICE.

CHARLES F. BRUSH, OF CLEVELAND, OHIO.

SECONDARY BATTERY.

SPECIFICATION forming part of Letters Patent No. 261,995, dated August 1, 1882.

Application filed June 9, 1881. (No model.)

*To all whom it may concern:*

Be it known that I, CHARLES F. BRUSH, of Cleveland, in the county of Cuyahoga and State of Ohio, have invented certain new and useful Improvements in Secondary Batteries; and I do hereby declare the following to be a full, clear, and exact description of the invention, such as will enable others skilled in the art to which it pertains to make and use it, reference being had to the accompanying drawings, which form part of this specification.

My invention relates to secondary batteries; and it consists in a peculiar construction of the cells of such apparatus, as hereinafter set forth. This construction is such that the plates or elements of the battery form the principal walls of the cells or vessels containing the liquid in contact with the said plates, and when several cells are arranged in series for high electromotive force one side of a plate or element may form the positive side of one cell, while the other side of the same plate forms the negative side of the adjoining cell. Thus great economy may be effected both in the cost of construction of a battery and in space occupied. Not only may plain plates or sheets of lead or other suitable material be employed in this construction, but corrugated, ribbed, studded, cellular, or equivalent plates may also be used, and the plates, of whatever description, may be "formed" or developed in any suitable manner, or they may be provided or combined with an active coating of any description, applied by any suitable process or processes.

Figure 1:
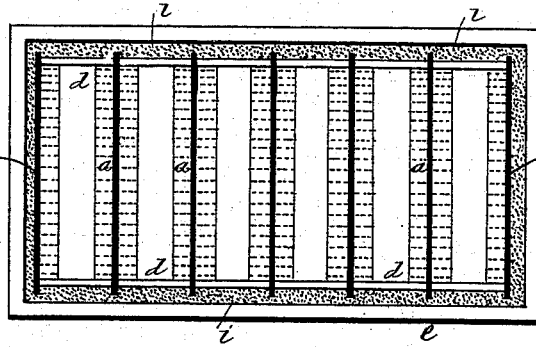
Figure 2:
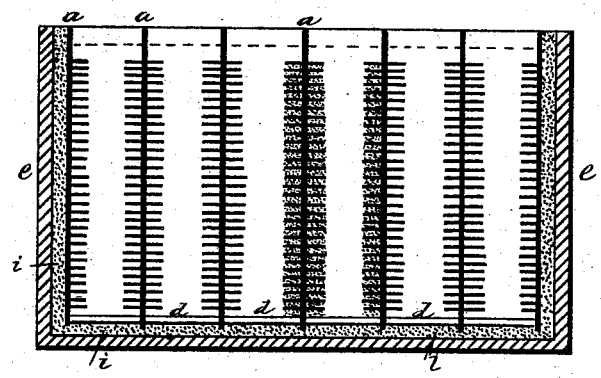

In the drawings, Figure 1 shows a plan view of a secondary battery constructed according to my present invention. Fig. 2 is a sectional elevation of the same. Fig. 3 is a transverse section taken through the battery. Figs. 4 and 5 show forms of corrugated plates. Fig. 6 is a vertical section of a ribbed plate. Fig. 7 is a plan and top view of a ribbed plate. Fig. 8 represents different forms of ribbed plates. Fig. 9 shows a honeycomb-plate. Fig. 10 shows a studded plate, and Fig. 11 is a ribbed corrugated plate.

In these figures, $a\,a\,a$ are ribbed plates, each provided with a plain or unribbed margin. The plates, arranged as shown, are separated by temporary or permanent strips or bars $d\,d$, of non-conducting material, if permanent, so as to leave a portion of the margin projecting. The pile of plates thus arranged is placed in a suitable box or other receptacle, leaving a space at the sides and bottom of the pile of plates. This space is afterward filled with a suitable insulating and impervious cement, $i\,i$, rendered for the purpose fluid or elastic by heat or otherwise. Thus the free margins of the plates are permanently embedded in the cement, whereby the plates are retained in position, insulated from each other, and made to form separate water-tight cells. The spaces between the plates are filled with dilute sulphuric acid or other suitable liquid, and the extreme plates (ribbed on the exposed side only) form the terminals of the battery, as indicated. The temporary strips $d\,d$ and the cement $i\,i$ may extend almost entirely around the plates $a\,a$, leaving only a small opening for introducing the liquid and for ventilation. Such closed, or nearly closed, cells are highly convenient when portable apparatus is required. Evaporation is also prevented thereby, and uniformity of the inclosed liquid disturbed in charging or discharging the battery may be secured by occasional partial or complete inversion of the apparatus.

The active coating may be formed or produced on the surface or surfaces of the plate by the oxidizing action of an electric current, or porous or spongy lead may be applied through the agency of electricity, or mechanically; or oxide of lead or a compound containing lead may be applied to the plate and reduced to porous metallic lead by a reducing atmosphere.

Having fully described my invention, what I claim as new, and desire to secure by Letters Patent, is—

1. In a secondary battery, two or more plates or elements having their edges embedded in suitable cement, substantially as set forth.

2. In a secondary battery, two or more plates or elements having their edges embedded in suitable cement, and the end plates having their outer surfaces covered, or practically covered, by cement, substantially as set forth.

3. In a secondary battery, the combination, with a trough or receptacle and two or more plates or elements, of cement placed on the interior of the trough or receptacle, the edges of the plates being embedded in said cement, substantially as set forth.

4. In a secondary battery, the combination, with two or more plates or elements, of separating and insulating strips, and cement placed between the edges of the plates or elements, substantially as set forth.

5. In a secondary battery, the combination of two or more plates provided with an active coating and having their edges embedded in suitable cement, substantially as set forth.

6. In a secondary battery, the combination of two or more plates constructed with cells, grooves, or cavities, and provided with an active coating and having their edges embedded in suitable cement, substantially as set forth.

7. In a secondary battery, the combination, with two or more plates, each provided with an active coating, of a trough or receptacle, strips interposed between the edges of the plates, and a coating of cement on the inner surface of the trough or receptacle, substantialy as set forth.

In testimony whereof I have signed my name to this specification in the presence of two subscribing witnesses.

CHARLES F. BRUSH.

Witnesses:
   JNO. CROWELL, Jr.,
   ALBERT E. LYNCH.